US006315865B1

(12) United States Patent
Allen et al.

(10) Patent No.: US 6,315,865 B1
(45) Date of Patent: Nov. 13, 2001

(54) SILYL-LINKED POLYAMIDOAMINE AND THEIR PREPARATION

(75) Inventors: Anthony John Allen, Wilmington; Arjun C. Sau, Newark, both of DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 09/257,903

(22) Filed: Feb. 25, 1999

Related U.S. Application Data (60) Provisional application No. 60/076,282, filed on Feb. 27, 1998.

(51) Int. Cl.[7] .................................................. D21H 17/55
(52) U.S. Cl. ...................... 162/145; 162/156; 162/164.3; 162/164.4; 162/164.6; 162/168.2
(58) Field of Search ..................................... 162/145, 156, 162/164.3, 164.4, 164.6, 167, 168.2

(56) References Cited

U.S. PATENT DOCUMENTS

| | | | |
|---|---|---|---|
| 2,926,116 | 2/1960 | Keim | 162/164 |
| 2,926,154 | 2/1960 | Keim | 260/29.2 |
| 3,288,754 | * 11/1966 | Green | 260/47 |
| 3,637,550 | 1/1972 | Sprauer | 260/18 |
| 3,992,251 | 11/1976 | Lipowski | 162/164 |
| 4,287,110 | 9/1981 | Takagishi et al. | 260/29.2 |
| 4,501,640 | 2/1985 | Soerens | 162/111 |
| 4,528,316 | 7/1985 | Soerens | 524/503 |
| 4,973,680 | 11/1990 | Billmers | 536/58 |
| 4,990,563 | 2/1991 | Sau | 525/61 |
| 4,992,538 | 2/1991 | Sau | 536/84 |
| 5,004,791 | 4/1991 | Billmers | 527/300 |
| 5,032,682 | 7/1991 | Sau | 536/84 |
| 5,036,137 | 7/1991 | Sau | 525/61 |
| 5,071,978 | 12/1991 | Sau | 536/124 |
| 5,156,718 | * 10/1992 | Neubert | 162/145 |
| 5,338,807 | 8/1994 | Espy et al. | 525/430 |
| 5,354,829 | 10/1994 | Swisher et al. | 528/10 |
| 5,393,379 | * 2/1995 | Parrinello | 162/145 |

FOREIGN PATENT DOCUMENTS

| | | |
|---|---|---|
| 979579 | 12/1975 | (CA) . |
| 1174560 | 7/1989 | (JP) . |

* cited by examiner

*Primary Examiner*—Peter Chin
(74) *Attorney, Agent, or Firm*—Martin F. Sloan; Robert P. O'Flynn O'Brien (57) ABSTRACT

Silyl-linked polyamidoamines, and aqueous compositions including these resins, which have utility in wet strength, dry strength, creping, and glass fiber forming size applications. The resins also are useful as strength additives for paper that contains silicate mineral fillers and/or glass fibers.

16 Claims, 1 Drawing Sheet

Idealized resin structure

Fig. 1 ated. Among the silanes disclosed as being suitable for modifying the polyamide-polyimide prepolymer is 3-glycidoxypropyltrimethoxysilane.

U.S. Pat. Nos. 4,990,563, 4,992,538, 4,973,680, 5,004,791, 5,032,682, 5,036,137, and 5,071,978 disclose various silated poly[vinyl alcohol]s and polysaccharides.

SILYL-LINKED POLYAMIDOAMINE AND THEIR PREPARATION

CROSS-REFERENCE TO RELATED APPLICATIONS

This application claims the benefit of U.S. Provisional Application No.60/076,282, filed on Feb. 27, 1998 and is related to U.S. patent application Ser. No. 08/665,965, filed on Jun. 16, 1996, entitled "Silyl-Linked Polyamidoamines and Their Preparation, the inventors of which are Anthony J. Allen and Arjun C. Sau, and the disclosures of which are hereby incorporated by reference thereto in their entirety.

BACKGROUND OF THE INVENTION

1. Field of the Invention

The present invention relates to silyl-linked polyamidoamines, and to the preparation of silyl-linked polyamidoamines.

2. Description of Background and Other Information

Polyamidoamine-epichlorohydrin resins have been used extensively as wet strength agents for paper, as creping adhesives, and for other applications. Silanated resins are also known.

Japanese Patent Publication No. 1174560 discloses a standard-temperature curable composition which includes (1) a compound obtained by the addition product of (a) an epoxyalkylalkyloxysilane and (b) the reaction product of a polyvalent carboxylic acid with a polyamine compound having at least two primary and/or secondary amino groups, and (2) a polyoxyalkylene ether chain polymer with a hydrolyzable silicon group. For compound (1), this publication discloses 3-glycidoxypropyltrimethoxysilane as a suitable epoxyalkyl-alkyloxysilane, diethylenetriamine as a suitable polyamine, and adipic acid as a suitable polyvalent carboxylic acid; long-chain dibasic acids of $C_{12}$ or more are indicated to be particularly suitable. Also for compound (1), this publication discloses an equivalent ratio of amino groups to carboxyl groups of 2:1, for the condensation of polyamine with polycarboxylic acid. The composition is disclosed as having utility as an adhesive, sealant, coating agent, paint, and injection agent. There is discussion of sealants used to seal joints between automobile steel plates, and used as injection agents for the repair of building tile joints; durability under weather temperature variation is mentioned as a factor.

U.S. Pat. No. 3,637,550 discloses silanated polyamide adhesives for bare metal substrates, prepared by melt blending dry and nonacidic polyamides of specified class, containing less than 0.5 weight percent moisture, with silanating compounds also of specified class. This patent further discloses that if the polyamide contains substantially more than 0.5 percent moisture, a processable thermoplastic polymer providing bonds of significantly improved moisture resistance is not obtained. Example 13 discloses a polyamide prepared from hexamethylenediamine, diethylenetriamine, dimerized fatty acid, adipic acid, sebacic acid, and acetic acid; Example 14 discloses reaction of the Example 13 polyamide with 3,4-epoxy-cyclohexylethyltrimethoxysilane.

U.S. Pat. No. 3,288,754 discloses silicon-modified polyamide-polyimides. The polyamide-polyimide prepolymer is prepared by the reaction of a diamine with an anhydride or its derivative having at least three carbonyl-containing groups per molecule. Polar organic solvents are preferred for the reaction of the anhydride with the diamine; water beyond trace amounts in the system cannot be tolerated. Among the silanes disclosed as being suitable for modifying the polyamide-polyimide prepolymer is 3-glycidoxypropyltrimethoxysilane.

SUMMARY OF THE INVENTION

The present invention pertains to silyl-linked polyamidoamines. An advantage of the resins of the invention is that they do not require storage at an acidic pH to maintain stability—for instance, to prevent gelation.

Preferably, the silyl-linked polyamidoamines of the present invention are thermosetting. Also as a matter of preference, they are soluble in an aqueous medium.

The silyl-linked polyamidoamines of the invention can comprise the reaction product of reactants which comprise at least one dicarboxylic acid or dicarboxylic acid derivative, at least one polyamine, and at least one silylating agent. The reactants further can comprise at least one cationizing agent, and/or at least one endcapping agent.

Particularly, the silyl-linked polyamidoamines of the invention can comprise the reaction product of the at least one silylating agent, and a polyamidoamine prepolymer comprising the reaction product of the at least one dicarboxylic acid or dicarboxylic acid derivative and the at least one polyamine; the reactants for preparing the prepolymer can also include at least one endcapping agent. Preferably, the at least one silylating agent comprises at least one first site reactive with silylating agent reactive amine groups in the polyamidoamine prepolymer, and at least one hydrolyzable site.

Also as a matter of preference, the mole ratio of the at least one silylating agent, to silylating agent reactive amine groups in the polyamidoamine prepolymer, is between about 0.05 and about 2.0. This mole ratio is more preferably between about 0.1 and about 0.75, and between about 0.15 and about 0.5 as a matter of particular preference.

DESCRIPTION OF THE INVENTION

As used herein, "hydrocarbyl" includes "aliphatic", "cycloaliphatic", and "aromatic", such as alkyl, alkenyl, alkynyl, cycloalkyl, aryl, aralkyl, and alkaryl groups. Further, "hydrocarbyl" is understood as including both non-substituted hydrocarbyl groups and substituted hydrocarbyl groups, with the latter referring to the hydrocarbyl portion bearing additional substituents, besides the carbon and hydrogen; correspondingly, "aliphatic", "cycloaliphatic", and "aromatic" are understood as including both nonsubstituted aliphatic, cycloaliphatic, and aromatic groups, and substituted aliphatic, cycloaliphatic, and aromatic groups, with the latter referring to the aliphatic, cycloaliphatic, and aromatic portion bearing additional substituents, besides the carbon and hydrogen.

Also as used herein, "aqueous medium" includes water and water-based media. Acidic, basic, and neutral aqueous media are all aqueous media, for the purpose of the present invention.

Yet further, the term "furnish" is recognized in the art, and is used herein in accordance with its commonly understood meaning. Particularly, it is understood that a furnish is a water suspension of fiber materials and additives being prepared for conversion into paper or paperboard.

The dicarboxylic acids and dicarboxylic acid derivatives of the invention comprise two amidization reactive carboxyl (i.e., —COOH) groups.

Suitable dicarboxylic acids for the invention include the $C_2$–$C_{12}$ dicarboxylic acids. Particular dicarboxylic acids which are suitable include oxalic, malonic, succinic, glutaric, adipic, pimelic, suberic, azelaic, sebacic, maleic, fumaric, itaconic, phthalic, isophthalic, and terephthalic acids. The $C_8$ and lower dicarboxylic acids are preferred, as providing prepolymers of the invention with better water solubility.

Suitable dicarboxylic acid derivatives for the invention include dicarboxylic acid esters and dicarboxylic acid halides, such as esters and halides of the aforementioned $C_2$–$C_{12}$ dicarboxylic acids. Preferred derivatives are the esters.

Dicarboxylic acid esters which may be used include esters of the $C_2$–$C_{12}$ dicarboxylic acids, and especially the $C_1$–$C_3$ diesters of these acids. Particular diesters which are suitable include dimethyl adipate, dimethyl malonate, diethyl malonate, dimethyl succinate, and dimethyl glutarate.

Appropriate dicarboxylic acid halides include adipoyl chloride, glutaryl chloride, and sebacoyl chloride.

The polyamines of the invention comprise at least two amidization reactive amine groups. Preferably the amidization reactive amine groups are primary amine groups.

Also as a matter of preference, the polyamines of the invention further comprise at least one silylating agent reactive amine group. The silylating agent reactive amine groups are preferably secondary and/or tertiary amine groups.

Suitable polyamines include the polyalkylene polyamines—including those having at least two primary amine groups and also at least one secondary and/or at least one tertiary amine group. Especially preferred polyamines, including the polyalkylene polyamines, are those having two primary amine groups and also at least one secondary and/or at least one tertiary amine group. Particular suitable polyamines include diethylenetriamine (DETA), triethylenetetramine (TETA), tetraethylenepentamine (TEPA), iminobispropylamine (IBPA), N-methyl-bis-(aminopropyl)amine (MBAPA), and bis-hexamethylenetriamine.

Endcapping agents are understood as including whatever attaches to or reacts with the dicarboxylic acid, dicarboxylic acid derivative, or polyamine—or attaches to or reacts with dicarboxylic acid or polyamine residues—and thereby prevents the further reaction of these reactants and residues. Particularly, it is further amidization reactions of these reactants and residues which are thusly prevented.

Suitable endcapping agents for the invention include the monofunctional amines, the monofunctional carboxylic acids, and the monofunctional carboxylic acid esters. It is understood that the monofunctional amines are those amines having only one amidization reactive amine group, that the monofunctional carboxylic acids are those carboxylic acids having only one amidization reactive carboxyl group, and that the monofunctional carboxylic acid esters are those carboxylic acid esters having only one amidization reactive ester group.

Suitable monofunctional amines include monofunctional primary amines, including monoalkyl amines and monoalkanol amines, and monofunctional secondary amines, including dialkyl amines and dialkanol amines.

Among the monofunctional primary amines which are suitable are butylamine, ethanolamine (i.e., monoethanolamine, or MEA), cyclohexylamine, 2-methylcyclohexylamine, 3-methylcyclohexylamine, 4-methylcyclohexylamine, benzylamine, isopropanolamine (i.e., monoisopropanolamine), mono-sec-butanolamine, 2-amino-2-methyl-1-propanol, tris(hydroxy-methyl) aminomethane, tetrahydrofurfurylamine, furfurylamine, 3-amino-1,2-propanediol, 1-amino-l-deoxy-D-sorbitol, and 2-amino-2-ethyl-1,3-propanediol. Among the monofunctional secondary amines which are suitable are diethylamine, dibutyl-amine, diethanolamine (i.e., DEA), di-n-propylamine, diiso-propanolamine, di-sec-butanolamine, and N-methylbenzylamine.

Monofunctional carboxylic acids which are suitable for the present invention include benzoic acid, 2-hydroxybenzoic acid (i.e., salicylic acid), 3-hydroxybenzoic acid, acetic acid, phenylacetic acid, propionic acid, butyric acid, valeric acid, caproic acid, caprylic acid, oleic acid, ortho-toluic acid, meta-toluic acid, and para-toluic acid, ortho-methoxybenzoic acid, meta-methoxybenzoic acid, and para-methoxybenzoic acid.

Monofunctional carboxylic acid esters which are suitable for the present invention include methyl acetate, ethyl acetate, methyl benzoate, ethyl benzoate, methyl propionate, ethyl propionate, methyl butyrate, ethyl butyrate, methyl phenyl acetate, and ethyl phenyl acetate.

Silylating agents appropriate for the present invention include silicon compounds, including silanes and siloxanes, and particularly organosilanes and organosiloxanes, comprising:

at least one first site, reactive with silylating agent reactive amine groups in the prepolymer of the invention; and at least one hydrolyzable site.

Preferably, the hydrolyzable sites, upon undergoing hydrolysis, hydrolyze to second sites which also are reactive with silylating agent reactive amine groups in the prepolymer of the invention.

By reaction of the indicated first and second sites, the silylating agent links silylating agent reactive amine groups of the prepolymer, thereby connecting prepolymer chains. The silylating agent reactive amine groups are understood as including the prepolymer secondary and tertiary amine groups which thusly react with the silylating agents.

Silylating agents accordingly link the prepolymer to provide the silyl-linked polyamidoamine polymers or resins of the invention. In the silyl-linked polyamidoamines of the invention, at least a portion of the silylating agent is reacted at both first and second sites, thereby linking prepolymer chains.

The silyl-linked polyamidoamines of the invention include resins wherein all, or substantially all or essentially all, of the silylating agent is reacted at first and second sites to thusly link prepolymer. The polymers of the invention also include resins wherein only a portion of the silylating agent is reacted at both first and second sites; the remainder of the silylating agent is reacted only at the first site, and accordingly is also characterized by unhydrolyzed hydrolyzable sites, and/or by hydrolyzed sites which are unreacted with silylating agent reactive amine groups in the prepolymer.

Suitable silylating agents include compounds of the formula wherein:
(a) A comprises a substituent comprising the at least one first site;
(b) B comprises a spacer group situated between A and Si; and
(c) at least one of $R_1$, $R_2$, and $R_3$ comprises the at least one hydrolyzable site.

Substituents suitable as A include isocyanate (—N═C═O), epoxide (oxirane), oxetane, aziridine, azetidine, carboxylic acid anhydride, acryloxy, methacryloxy, acrylamido, and methacrylamido groups. Other substituents from which A may be chosen include halogens (—Cl, —Br, —I, —F) and carboxylic acid halides (—C(═O)—Z where —Z is —Cl, —Br, —I, or —F). However, where A includes a halogen, reaction of the silylating agent first site with silylating agent reactive amine groups in the prepolymer generates a hydrogen halide acid byproduct. Accordingly, halogen-containing substituents are less preferable for A than the other indicated reactive functionalities.

B may be a hydrocarbyl group. Suitable hydrocarbyl groups include alkyl, alkenyl, aryl, aralkyl, and alkaryl substituents. Further, the hydrocarbyl group may include at least one hydrolytically stable heteroatom linkage; in this regard, "hydrolytically stable" is understood as meaning that the linkage does not undergo hydrolysis in the presence of an aqueous medium. Suitable hydrolytically stable heteroatom linkages include ether, ester, amide, sulfide, sulfone, sulfoxide, and tertiary amine linkages.

As noted herein, at least one of $R_1$, $R_2$, and $R_3$ comprises a hydrolyzable site; correspondingly, at least one of $R_1$, $R_2$, and $R_3$ is preferably a hydrolyzable substituent. As a matter of particular preference, each of $R_1$, $R_2$, and $R_3$ comprises a hydrolyzable site; correspondingly, also as a matter of particular preference, all of $R_1$, $R_2$, and $R_3$ are hydrolyzable substituents. $R_1$, $R_2$, and $R_3$ may be the same or different substituents—with the proviso that because at least one of these comprises a hydrolyzable site, they cannot be identical where fewer than all of $R_1$, $R_2$, and $R_3$ do comprise a hydrolyzable site.

Suitable hydrolyzable substituents for $R_1$, $R_2$, and $R_3$ include alkoxy, aryloxy, acyloxy, siloxy, and amine groups, and halogen (—Cl, —Br, —I, —F) substituents. However, halosilanes—for instance, the chlorosilanes—generate hydrogen halide acid byproducts (e.g., hydrochloric acid) on hydrolysis. Accordingly, here also halogen-containing substituents are less preferable than other reactive functionalities.

Preferred hydrolyzable substituents for $R_1$, $R_2$, and $R_3$ are the $C_1$–$C_4$ alkoxy groups. Methoxy and ethoxy are particularly preferred; upon hydrolysis, these give methanol and ethanol, respectively, as byproducts.

Where not all of $R_1$, $R_2$ and $R_3$ comprise a hydrolyzable site, those of $R_1$, $R_2$, and $R_3$ lacking a hydrolyzable site are accordingly nonhydrolyzable substituents. Suitable nonhydrolyzable substituents include alkyl, alkenyl, aryl, aralkyl, and alkaryl substituents; of these, the $C_1$–$C_4$ alkyl, $C_1$–$C_4$ alkenyl, $C_6$–$C_{12}$ aryl, $C_7$–$C_{13}$ aralkyl, and $C_7$–$C_{13}$ alkaryl substituents are preferred.

Suitable silylating agents also include vinylalkoxy-silanes of the formula wherein $R_1$, $R_2$, and $R_3$ are as discussed herein.

Particular silylating agents which are appropriate include 3-glycidoxypropyltrimethoxysilane (GPTMS), (3-glycidoxypropyl) diisopropylethoxysilane, 2-(3,4-epoxycyclo-hexyl)ethyltrimethoxysilane, 3-methacrylamidopropyltriethoxy-silane, 3-methacryloxypropyl dimethoxysilane, 3-methacryloxypropyl trichlorosilane, 3-methacryloxypropyldimethylchloro-silane, 3-acryloxypropyltrichlorosilane, 3-acryloxypropyltrimethoxy silane, 3-acrylamidopropyltriethoxysilane, 2-chloro-acetamidopropyltriethoxysilane, (3-glycidoxypropyl)methyldi-ethoxysilane, (3-glycidoxypropyl)dimethylethoxysilane, (3-glycidoxypropyl)methyldiisopropenoxysilane, and 1-methyl-4-[1-methyl-2-(triethoxysilylethyl)]cyclohexene-1-epoxide.

The prepolymer of the invention is preferably soluble in an aqueous medium; particularly, it is preferably water soluble—and is preferably a polyamidoamine. The prepolymer of the invention can be obtained by a polycondensation reaction of the dicarboxylic acid and polyamine.

The prepolymer of the invention can be an endcapped prepolymer—preferably, an endcapped polyamidoamine. The endcapped polyamidoamine prepolymer of the invention can be obtained by including endcapping agent with the dicarboxylic acid and polyamine in the polycondensation reaction.

In this regard, the inclusion of an appropriate amount of an endcapping agent in the polycondensation reaction gives a lower, controlled molecular weight prepolymer with no reactive endgroups—or with substantially no reactive endgroups, or essentially no reactive endgroups. The result will be a resin having a more highly branched structure than that obtained with higher molecular weight prepolymers. Control of the resin's branching can be desirable for obtaining materials with unique and beneficial rheological properties.

The diacid and polyamine—and endcapping agent, when present—undergo amidization—i.e., carboxyl groups and amine groups of these reactants react to form amide functionalities. In this context, amidization reactions are understood as including condensation reactions of the diacid and polyamine—particularly, reaction of diacid carboxyl groups with polyamine primary amine groups—in formation of prepolymer chains. Where endcapping agent is present, amidization reactions are also understood as including reactions of endcapping agents with prepolymer chain end groups—particularly, reaction of monofunctional carboxylic acid carboxyl groups with prepolymer primary amine groups, and reaction of the amine groups of monofunctional amines with prepolymer carboxyl groups—to form endcapped prepolymer.

Further in this context, amidization reactive groups are understood as including the carboxyl and amine groups of the diacids, polyamines, and endcapping agents which undergo the amidization reactions. Particularly as to the polyamines, the amidization reactive groups are understood as including the primary amine groups of the polyamines.

One or more of each of the diacid and polyamine—and where present, the endcapping agent—may be employed in the polycondensation; further, one or more dicarboxylic acid derivatives may be used in place of, or in addition to, the dicarboxylic acid. Particularly as to endcapping agent, one or more monofunctional amines and/or one or more monofunctional carboxylic acids may be used.

Where endcapping agent is included, its volatility should be low enough so that this agent remains in the prepolymerization reaction at the temperature at which the reaction is being conducted. Particularly, when the endcapped prepolymer is prepared by thermally driven polycondensation, volatility is a significant feature of the endcapping agent; in this instance, an endcapping agent of lesser volatility is preferred. The boiling point of the endcapping agent should be high enough so that, at the temperature being employed to drive off the condensation byproduct—i.e., water where a diacid reactant is used, and alcohol in the case of diester—the agent is not also removed.

Considering the foregoing, for diacids—particularly where the diacid and polyamine are adipic acid and DETA—the prepolymerization will customarily be conducted at about 150–180° C.—more preferably, about 160–170° C. In this instance, if endcapping agent is also present, it should therefore have a boiling point above 180° C.—or above 170° C., in the case of the indicated 160–170° C. range—so that it is not driven off with the water.

Where diester is used instead of diacid, and the resulting alcohol condensation product is more volatile than water, an endcapping agent of greater volatility may be used. Because not as high a temperature is required for removing the alcohol, the endcapping agent can correspondingly have a lower boiling point without being taken off.

The polycondensation reaction of dicarboxylic acid and/or derivative with polyamine thusly provides a prepolymer comprising polymer chains which include alternating dicarboxylic and polyamine residues. Where endcapping agent is included, these chains are terminated by endcaps—thereby rendering an endcapped prepolymer. It is understood that the dicarboxylic and polyamine residues are the units remaining after the amidization reactions of dicarboxylic acid and/or derivative with polyamine to form the prepolymer chains, and that the endcaps also are residues—i.e., the units remaining after reaction of endcapping agent with prepolymer chain end groups.

The molar ratio of diacid to polyamine used in preparing the prepolymer can be 1:1, or about 1:1. One of these can be used in excess of the other, to give a lower molecular weight prepolymer with reactive endgroups (i.e., carboxyl or amine substituents). If an excess of the diacid is employed, the resulting prepolymer will be characterized by a preponderance of carboxyl end groups; if an excess of polyamine is employed, the resulting prepolymer will be characterized by a preponderance of primary amine end groups.

Prepolymer molecular weight can also be controlled by including endcapping agent in the prepolymer synthesis. Where endcapping agent is present, the relative proportions of dicarboxylic acid, polyamine, and endcapping agent are preferably such that the total number of amidization reactive carboxyl groups contributed by these reactants is equal, or at least substantially equal or essentially equal, to the total number of amidization reactive amine groups which are contributed; accordingly, the ratio of the total number of these amidization reactive carboxyl groups to the total number of amidization reactive amine groups is preferably 1:1, or about 1:1. This correspondence between amidization reactive carboxyl and amine groups is necessary so that endcapping of the prepolymer will likewise be complete, or at least substantially complete or essentially complete.

Therefore, where the endcapping agent is a monofunctional carboxylic acid, the relative proportions of diacid, polyamine, and endcapping agent will be such that the total number of amidization reactive carboxyl groups contributed by the diacid and the endcapping agent together will be equal, or at least substantially equal or essentially equal, to the number of amidization reactive amine groups contributed by the polyamine. And where the endcapping agent is a monofunctional amine, the relative proportions of diacid, polyamine, and endcapping agent will be such that the total number of amidization reactive amine groups contributed by the polyamine and the endcapping agent together will be equal, or at least substantially equal or essentially equal, to the number of amidization reactive carboxyl groups contributed by the diacid.

Specifically, taking a 1:1 molar ratio of diacid and polyamine as the starting point, preferably two moles, or about two moles, of the endcapping agent are employed in place of one mole of whichever of the diacid and polyamine is its competing reactant. Accordingly, if the endcapping agent is a monofunctional carboxylic acid, it should be considered that two moles, or about two moles, of this acid is replacing each mole of the diacid in a 1:1 molar ratio of diacid and polyamine. Conversely, if the endcapping agent is a monofunctional amine, it should be considered that two moles, or about two moles, of this amine is replacing each mole of the polyamine in the indicated 1:1 diacid/polyamine molar ratio.

The prepolymers—particularly, the endcapped prepolymers—as disclosed in U.S. application Ser. No. 08/634,226, filed Apr. 18, 1996, are suitable as prepolymers for the present invention. Further, the process for preparing prepolymers—particularly, endcapped prepolymers—as disclosed in U.S. application Ser. No. 08/634,226 is also suitable for the present invention. This application is incorporated herein in its entirety, by reference thereto.

To prepare the silyl-linked resin of the invention, the prepolymer is reacted in an aqueous medium—particularly, in an aqueous solution—with silylating agent. One or more silylating agents may be employed. The silylating reaction is preferably conducted at between about 25° C. and about 60° C.—more preferably, at about 40° C.

Preferably in this silylating reaction, the mole ratio of silylating agent, to silylating agent reactive amine groups in the prepolymer, is between about 0.05 and about 2.0. Expressed in terms of mole percent, the mole percent of silylating agent, based on moles of silylating agent reactive amine groups in the prepolymer, is about 5 percent and about 200 percent. Accordingly, an excess of silylating agent—based on the amount of silylating agent reactive amine functionality present in the prepolymer—may be employed.

More preferably, the mole ratio of silylating agent, to silylating agent reactive amine groups in the prepolymer, is between about 0.1 and about 1.0—i.e., about 10 to about 100 mole percent silylating agent. Still more preferably, the mole ratio of silylating agent, to silylating agent reactive amine groups in the prepolymer, is between about 0.1 and about 0.75—i.e., about 10 to about 75 mole percent. As a matter of particular preference, the mole ratio of silylating agent, to silylating agent reactive amine groups in the prepolymer, is between about 0.15 and about 0.5—i.e., about 15 to about 50 mole percent.

It is understood that by moles of silylating agent reactive amine groups, it is meant the total number of amine groups in the prepolymer that are reactive with the silylating agent.

A functional compound that will impart cationic charge—particularly, to the silyl-linked polyamidoamine—may be reacted with the prepolymer of the invention, before the prepolymer is reacted with the silylating agent. Compounds suitable for this purpose are cationizing agents.

One cationizing agent, or two or more cationizing agents in combination, may be used. Particular cationizing agents which may be employed include glycidyltrimethylammonium chloride (GTMAC), [2-bromoethyl] trimethylammonium bromide, [3-bromopropyl] trimethylammonium bromide, [3-bromopropyl)triethylammonium bromide, [3-[methacryloylamino]propyl] trimethyl-ammonium chloride, [2-[methacryloyloxy]ethyl] trimethylammonium chloride, [2-[methacryloyloxy]ethyl] trimethylammonium methyl sulfate, [2-acryloyloxyethyl][4-benzoylbenzyl]dimethylammonium bromide, and [2-[acryloyloxy]ethyl]trimethylammonium methyl sulfate.

The amount of cationizing agent thusly employed is preferably that which will leave sufficient silylating agent reactive amine functionality for reaction with the silylating agent. Accordingly, the mole ratio of cationizing agent, to silylating agent reactive amine groups in the polyamidoamine prepolymer, is preferably less than 1.0—i.e., as a matter of preference, cationizing agent is used in an amount wherein there is less than 1.0 mole of cationizing agent per mole of silylating agent reactive amine groups in the prepolymer.

Where cationizing agent is employed, the mole ratio of cationizing agent, to silylating agent reactive amine groups in the prepolymer, is preferably between about 0.01 and about 0.95. Expressed in terms of mole percent, the mole percent of cationizing agent, based on moles of silylating agent reactive amine groups in the prepolymer, is about 1 percent and about 95 percent.

More preferably, the mole ratio of cationizing agent, to silylating agent reactive amine groups in the prepolymer, is between about 0.05 and about 0.5—i.e., about 5 to about 50 mole percent cationizing agent. Still more preferably, the mole ratio of cationizing agent, to silylating agent reactive amine groups in the prepolymer, is between about 0.1 and about 0.3—i.e., about 10 to about 30 mole percent.

Figure 1:
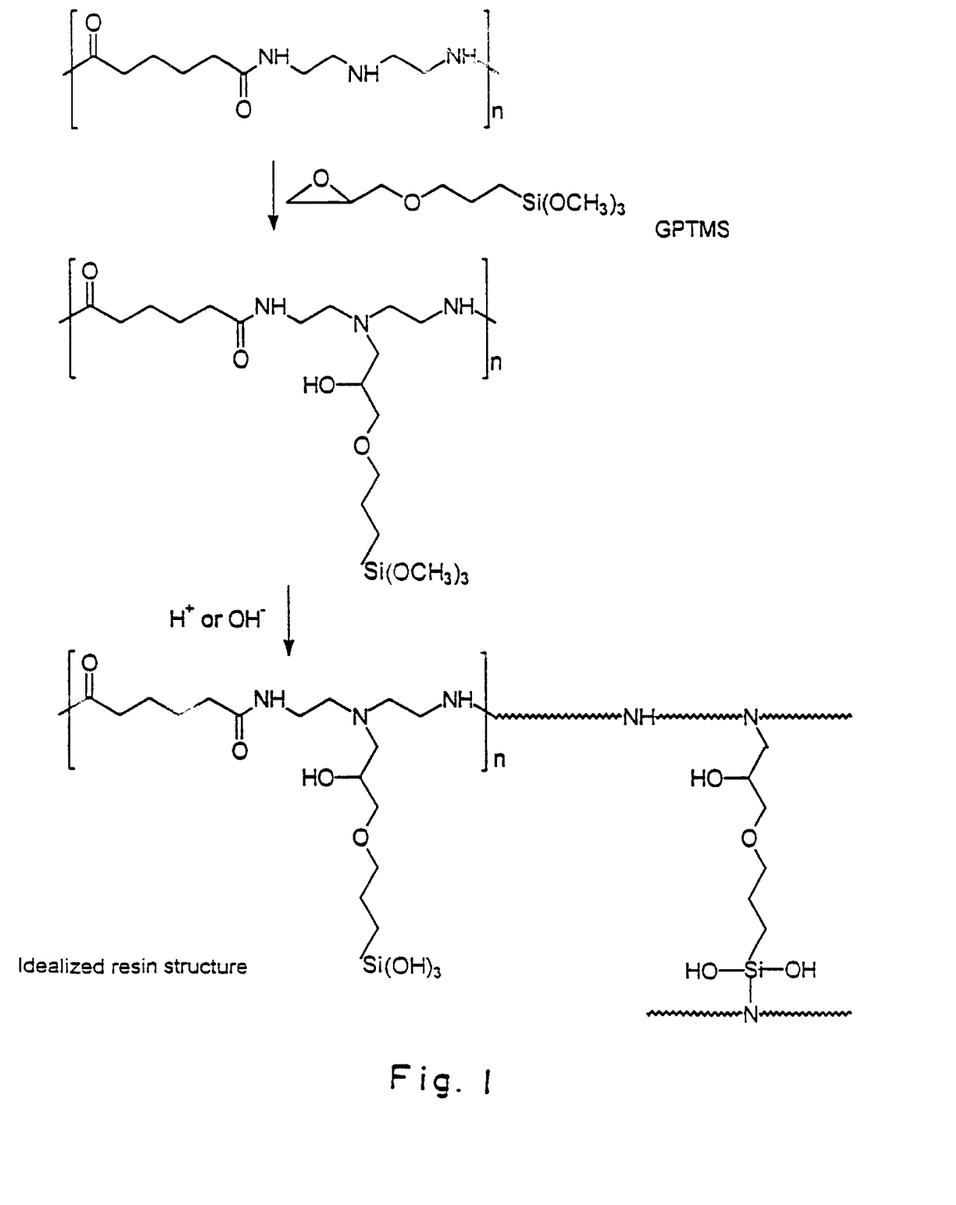
FIG. 1 is an idealized representation of the reactions occurring in formation of the silyl-linked polymer of the invention, and of the molecular structures obtained from these reactions—where the reactants employed are 3-glycidoxypropyltrimethoxysilane and a prepolymer prepared from adipic acid and diethylenetriamine.

An idealized representation of the reactions occurring in formation of the silyl-linked polymer of the invention—where the reactants employed are GPTMS and a prepolymer prepared from adipic acid and DETA—is shown in FIG. 1.

As discussed herein, the resin is prepared by a two step process. In the first step, prepolymer—preferably, water-soluble prepolymer—is obtained from reaction of dicarboxylic acid or dicarboxylic acid derivative with polyamine. The second step comprises reaction of the prepolymer—preferably, in aqueous solution—with silylating agent; the resulting silylated resin undergoes hydrolysis, to form the silyl-linked polymer. Particularly with GPTMS as the silylating agent, the hydrolysis produces methanol.

It is understood that FIG. 1 is not intended to be a complete and accurate representation of the reactions which are occurring in the process of preparing the resin, or a complete and accurate representation of the resulting molecular structures. In this regard, it is believed that after the hydrolysis, at least certain silylating agents, in addition to the reaction with amine groups, can undergo further reactions—particularly, further reactions linking prepolymer chains. For instance, it is believed that at least certain silylating agents can also interreact (i.e., undergo reaction between appended silylating agent moieties), and/or react with carboxylic acid and/or alcohol moieties, if these are present. Particularly in the case of GPTMS, it is believed that the silanol moieties resulting from hydrolysis can be thusly interreactive, and reactive with carboxylic acid and alcohol moieties.

It is further understood that the discussion herein concerning molecular structure and reactions is provided for the purpose of providing as complete an explanation of these features as is possible, to the extent that they are presently understood. Yet additionally, it is understood that this discussion does not limit the scope of the invention.

Preferably, the silyl-linked polymer of the invention is soluble in an aqueous medium—particularly, in water. In this regard, it is understood that resins which are not soluble in all aqueous media, but only in certain aqueous media—e.g., aqueous media having one or more particular properties—are "soluble in an aqueous medium" within the scope of the invention. For instance, particular polymers of the invention may go into solution only if the aqueous medium is neutral, or within a certain pH range, or sufficiently acidic, or sufficiently basic.

Also as a matter of preference, the silyl-linked polymer of the invention is thermosetting.

Particularly advantageous are the silyl-linked polyamidoamines which are prepared with minimal levels of halide ion, or with halide ion being completely absent, or substantially absent or essentially absent. Halide ions, such as chloride, can cause corrosion of metal surfaces—e.g., the surface of the Yankee dryer in creping applications. This corrosion can shorten the life of the Yankee dryer, and can require regrinding of the Yankee dryer surface, which is an expensive process. Accordingly the resins of the invention which are formed without the generation of halide ion, or with substantially or essentially no generation of halide ion—particularly, compositions of the invention lacking halide ion, or from which halide ion is substantially absent or essentially absent, are particularly advantageous.

The resins of the invention are suitable for treatment of, addition to, and incorporation with cellulosic and fibrous materials, especially cellulosic and fibrous webs, and most especially paper, including heavier paper materials such as paper board, and lighter paper materials such as facial tissue, bathroom tissue, paper towels, and paper napkins. The silyl-linked polyamidoamines of the invention have particular utility as creping aids, particularly creping adhesives, for cellulosic and fibrous materials, especially cellulosic and fibrous webs, and most especially paper, particularly lighter paper materials as discussed herein.

It is believed that the silyl-linked polyamidoamines of the invention also have utility as wet strength agents and as dry strength agents for cellulosic and fibrous materials, especially cellulosic and fibrous webs, and most especially paper—including heavier and lighter paper materials as discussed herein.

It is further believed that the silyl-linked polyamidoamines of the invention additionally have utility as glass fiber forming size compositions—particularly, to improve size adhesion to glass fibers.

The invention further pertains to compositions—including aqueous compositions—comprising silyl-linked polyamidoamines. The invention accordingly pertains to compositions—particularly, aqueous compositions—which comprise a silyl-linked polyamidoamine and an aqueous medium. Preferably, the silyl-linked polyamidoamine is dispersed in the aqueous medium. As a matter of particular preference, these compositions are solutions, with the silyl-linked polyamidoamine being soluble in, and thusly also dissolved in, the aqueous medium.

Compositions comprising the silyl-linked polyamidoamines of the invention are suitable for treatment of, addition to, and incorporation with cellulosic and fibrous materials, especially cellulosic and fibrous webs, and most especially paper, including tissue paper. Compositions comprising the silyl-linked polyamidoamines of the invention further are suitable for treatment of, particularly application to, glass fibers, including continuous filament glass fiber strands. Compositions of the invention—e.g., aqueous compositions of the silyl-linked polyamidoamines of the invention—preferably comprise amounts of the resin which are effective for the intended use.

Particularly, compositions of the invention, and most particularly aqueous compositions comprising the silyl-linked polyamidoamines of the invention, are suitable as creping adhesive, wet strength, and dry strength compositions—e.g., for cellulosic and fibrous materials, especially cellulosic and fibrous webs, and most especially paper, including tissue paper. Compositions of the invention, and most particularly aqueous compositions comprising the silyl-linked polyamidoamines of the invention, further are suitable as glass fiber forming size compositions. These compositions comprise amounts of the resin effective for the intended (e.g., creping adhesive, wet strength, dry strength, or sizing) function.

Suitable aqueous compositions of the invention, particularly aqueous solutions, include those having concentrations of about 1–60% by weight resin. For creping adhesive, wet strength, dry strength, and sizing applications, solution concentrations of about 1–40% by weight resin are preferred; concentrations of about 5–35% are more preferred, while the most preferred concentrations are about 10–30%.

The invention also pertains to cellulosic and fibrous materials, especially cellulosic and fibrous webs, and most especially paper, including tissue paper, comprising the silyl-linked polyamidoamines of the invention. The invention yet additionally pertains to sized glass fibers comprising the silyl-linked polyamidoamines of the invention. These materials preferably incorporate amounts of the resin effective for the intended function.

When employed as wet and dry strength agents, the resins of the invention are preferably present in amounts of about 0.1–5% by weight resin, based on the dry weight of the cellulosic material. The quantity of resin present depends upon the degree of wet and/or dry strength desired in the finished product, and on the amount of resin retained by the cellulosic fibers.

Compositions and resins of the invention can be employed as creping adhesives, wet strength agents, dry strength agents, and glass fiber forming size agents, according to the standard methods as these are known in the art. For these applications, the compositions and resins of the invention can be employed in accordance with the procedures set forth in Canadian Patent No. 979,579, U.S. Application Ser. No.08/428,287, filed Apr. 25, 1995, U.S. Pat. No. 4,973,680, U.S. Pat. No. 3,992,251, and U.S. Pat. No. 2,926,116. These patents and application are incorporated herein in their entireties, by reference thereto.

Particularly for wet strength and dry strength applications, the agents are typically added to the pulp furnish any time before the sheet is formed.

In this regard, the invention pertains to the making of paper by a process which includes addition of the silyl-linked polyamidoamine to provide wet strength, and/or to provide dry strength, to the paper. This process can include the steps of providing a furnish, adding the resin of the invention to the furnish, forming a sheet from the furnish after addition of the silyl-linked polyamidoamine, and drying the sheet to form paper.

With respect to creping applications, fibrous webs, particularly paper webs, are conventionally subjected to the creping process in order to give them desirable textural characteristics, such as softness and bulk; this is particularly the case in the manufacture of tissue paper. The creping process typically involves adhering the web to a drying surface for the web; preferably, this surface is the surface of a rotating creping cylinder, such as the apparatus known as a Yankee dryer. The web is subsequently dislodged from the surface with a creping device—preferably, a doctor blade. The impact of the web against the creping device ruptures some of the fiber-to-fiber bonds within the web, causing the web to wrinkle or pucker.

The severity of this creping action is dependent upon a number of factors, including the degree of adhesion between the web and the drying surface. In order to increase adhesion, a creping adhesive is generally applied to the drying surface—generally in the form of an aqueous solution or dispersion—prior to the adherence of the web thereto.

The invention accordingly pertains to a process of creping paper. The creping process of the invention can comprise the steps of providing a fibrous web, and creping this web by applying the silyl-linked polyamidoamine to the web—and/or by applying the resin to a means for creping the web, and employing this means to crepe the web. Further in this regard, the creping process of the invention can include the steps of applying the silyl-linked polyamidoamine to a drying surface for fibrous web, providing a fibrous web, pressing the fibrous web against the drying surface to adhere this web to the surface, and dislodging the fibrous web from the drying surface with a creping device to crepe the fibrous web.

The invention yet additionally pertains to a process of repulping paper. This process can include the steps of providing paper which comprises the silyl-linked polyamidoamine of the invention, and forming a slurry comprising water and pulp prepared from the indicated paper. The invention further pertains to the process of making paper from pulp prepared according to the foregoing repulping process, and to paper made from this pulp.

In the production of glass fiber, molten glass flows or is pulled through tiny orifices or tips in a heated platinum bushing. The individual glass filaments are passed through a sizing bath, grouped into a strand, and then wound on a rapidly rotating forming tube. The size is applied to the filaments in order to bind them together, maintain the integrity of the strand during winding and unwinding, and facilitate eventual processing. The strand on the forming tube is thereafter placed in an oven to dry or is allowed to air dry to reduce the moisture content of the strand.

The invention accordingly further pertains to a process for sizing glass fibers, comprising applying the silyl-linked polyamidoamine of the invention to glass fibers during formation. Specifically, the size, as discussed above, can comprise the silyl-linked polyamidoamine of the invention.

The invention still further pertains to cellulosic and fibrous materials, especially cellulosic and fibrous webs, and most especially paper, including tissue paper, comprising the silyl-linked polyamidoamines of the invention, and further comprising glass fibers and/or one or more silicate minerals. The silyl-linked polyamidoamines of the invention here serve as strength additives. Particularly, the silyl-linked polyamidoamines of the invention are useful as strength additives in paper containing glass fibers and/or one or more silicate mineral fillers.

Glass fibers have been used in paper making to improve properties such as wet tensile, tear, bulk, density, opacity, brightness, and dimensional stability. Silicate minerals, such as clay and talc, are used, particularly as fillers, in a variety of paper grades, including newsprint, magazine paper, fine paper, and wrapping paper.

The silicate mineral additives have served to reduce expense and improve different properties, such as printability, surface smoothness, and opacity. However, the addition of fillers to paper can cause diminished bonding of the cellulose fibers, and thereby result in poorer strength properties for the paper.

Silyl-linked polyamidoamines of the present invention can be included in cellulosic material, to counter this weakening effect of the fillers. Specifically, as discussed herein, the silyl-linked polyamidoamines comprise silanol functionality. The silanol groups can react with the surface of silicate minerals and with silicate glass surfaces, and thereby provide increased strength to the web or sheet; these groups can also react with hydoxyl and carboxylate groups in the cellulose pulp.

Yet additionally, secondary, tertiary, and quaternary amine groups, of the silyl-linked polyamidoamines of the invention, can form complexes with carboxylate groups in the cellulose pulp. The secondary amine groups in particular can also form hydrogen bonds with pulp hydroxyl groups.

Accordingly, the silyl-linked polyamidoamines can react with cellulose pulp, with silicate minerals, and with glass fibers, to form a bridge between the two dissimilar materials participating in the reaction. This bridge provides a mechanism for strengthening the resulting aggregate material.

Silicate minerals suitable for the present invention include those conventionally used as fillers in paper. Particular examples are quartz, silica, fumed silica, kaolin clay, serpentine clay, montmorrilonite clay, attapulgite clay, vermiculite, glauconite, talc, mica, and diatomaceous earth.

Glass fibers suitable for the present invention include chopped strand fibers and blown glass fibers. Among the chopped strand fibers which may be used are those having dimensions of 6 mm in length and 9 to 14 $\mu$m diameters; particularly fibers with these dimensions, and which are appropriate, are those identified by glass industry standard code designations of G, H, and K. Also suitable are chopped strand fibers which have a length of 6 mm and a diameter of 6 $\mu$m, and have the designation DE.

When thusly employed in cellulosic materials with glass fibers and/or silicate minerals, the silyl-linked polyamidoamines of the invention are preferably present in amounts of about 0.01–10 percent by weight—more preferably about 0.05–5 percent by weight, and still more preferably about 0.1–2 percent by weight—based on the dry weight of the total materials present.

Glass fibers, when used, are preferably present in amounts of about 1–99 percent by weight, more preferably about 2–80 percent by weight, and still more preferably about 5–50 percent by weight, based on the dry weight of the total materials present.

The one or more silicate minerals, when employed, are preferably present in amounts of about 1–99 percent by weight, more preferably about 2–80 percent by weight, and still more preferably about 5–50 precent by weight, based on the dry weight of the total materials present.

The cellulosic material present is preferably present in amounts of about 1–99 percent by weight, more preferably about 10–90 percent by weight based on the dry weight of the total materials present. Also as a matter of preference, the cellulose material is present in the form of cellulose fibers.

A fibrous web, particularly a paper, comprising cellulosic material, glass fiber, and the silyl-linked polyamidoamine of the invention preferably includes about 0.01–10 percent by weight silyl-linked polyamidoamine, about 1–99 percent by weight cellulosic material, and about 1–99 percent by weight glass fiber, based on the dry weight of the total materials present. More preferably, the fibrous web includes about 0.05–5 percent by weight silyl-linked polyamidoamine, about 10–90 percent by weight cellulosic material, and about 2–80 percent by weight glass fiber, based on the dry weight of the total materials present. As a matter of particular preference, the fibrous web includes about 0.1–2 percent by weight silyl-linked polyamidoamine, about 10–90 percent by weight cellulosic material, and about 5–50 percent by weight glass fiber, based on the dry weight of the total materials present.

A fibrous web, particularly a paper, comprising cellulosic material, silicate mineral, and the silyl-linked polyamidoamine of the invention preferably includes about 0.01–10 percent by weight silyl-linked polyamidoamine, about 1–99 percent by weight cellulosic material, and about 1–99 percent by weight silicate mineral, based on the dry weight of the total materials present. More preferably, the fibrous web includes about 0.05–5 percent by weight silyl-linked polyamidoamine, about 10–90 percent by weight cellulosic material, and about 2–80 percent by weight silicate mineral, based on the dry weight of the total materials present. As a matter of particular preference, the fibrous web includes about 0.1–2 percent by weight silyl-linked polyamidoamine, about 10–90 percent by weight cellulosic material, and about 5–50 percent by weight silicate mineral, based on the dry weight of the total materials present.

A fibrous web, particularly a paper, comprising cellulosic material, glass fiber, silicate mineral, and the silyl-linked polyamidoamine of the invention preferably includes about 0.01–10 percent by weight silyl-linked polyamidoamine, about 1–99 percent by weight cellulosic material, about 1–99 percent by weight glass fiber, and about 1–99 percent by weight silicate mineral, based on the dry weight of the total materials present. More preferably, the fibrous web includes about 0.05–5 percent by weight silyl-linked polyamidoamine, about 10–90 percent by weight cellulosic material, about 2–80 percent by weight glass fiber, and about 2–80 percent by weight silicate mineral, based on the dry weight of the total materials present. As a matter of particular preference, the fibrous web included about 0.1–2 percent by weight silyl-linked polyamidoamine, about 10–90 percent by weight cellulosic material, about 5–50 percent by weight glass fiber, and about 5–50 percent by weight silicate mineral, based on the dry weight of the total materials present.

Whether or not glass fiber and/or silicate mineral are also present, the cellulosic and fibrous materials of the invention can also include, in addition to silyl-linked polyamidoamine, one or more additives that are conventional for these materials, particularly for paper. These one or more additives are employed in conventional amounts, as known in the art.

Among the suitable additives are non-silicate mineral fillers, such as calcium carbonate, sizing agents, alum, polyaluminum chloride (PAC), dyes, pigments, optical brighteners, retention aids, formation aids, and other commonly used strength additives. Examples of commonly used strength additives are starch and modified starches, polyamidoamine-epichlorohydrin wet strength agents, polyamine-epichlorohydrin wet strength agents, glyoxylated polyacrylamide wet strength agents, polyacrylamide polymers and copolymers, polyacrylic acid polymers and copolymers, carboxymethyl cellulose (CMC), hydroxyethyl cellulose (HEC), lattices, locust bean gum and modified locust bean gum, guar and modified guars.

With regard to the foregoing, the invention yet further pertains to the making of a fibrous web by a process which includes addition of the silyl-linked polyamidoamine to the fibrous web by a process which includes addition of the silyl-linked polyamidoamine to the fibrous web. This process can include the steps of providing a furnish, adding the resin of the invention to the furnish, forming a sheet form the furnish after addition of the silyl-linked polyamidoamine, and drying the sheet to form a fibrous web.

The silyl-linked polyamidoamine can be added to the furnish at any point prior to sheet formation, or may also be sprayed on the wet sheet after forming and before drying.

The invention is illustrated by the following Examples and Procedures; these are provided for the purpose of representation, and are not to be construed as limiting the scope of the invention. Unless stated otherwise, all percentages, parts, etc. are by weight.

Synthesis of the Prepolymers of Examples 1–7

EXAMPLE 1

A quantity of 171.3 g (1.66 mol) DETA was charged to a 500-ml five-necked resin kettle reactor equipped with a mechanical stirrer, reflux condenser, Dean-Stark distilling trap, and thermometer; the DETA was stirred gently at room temperature. While the DETA was being stirred, 242.6 g (1.66 mol) adipic acid was added over a period of 30 minutes, through the reactor port using a funnel. During addition of the adipic acid, the temperature of the reaction mixture rose to ~130° C.

After completion of the addition of adipic acid, and with the stirring continuing, the resulting reaction mixture was heated to 170° C. using a heating mantle and held at 170° C. for 2 hours. During the course of the condensation reaction of DETA with adipic acid, about 50 ml of water was collected in the Dean-Stark distilling trap.

Following the reaction, the stirring was halted, the slightly greenish-yellow molten reactor charge was poured into an aluminum pan. Upon cooling to room temperature, it solidified. The polyamidoamine thusly formed was water soluble.

EXAMPLE 2

A quantity of 300.22 g (2.91 moles) DETA was placed in a 1000 mL resin kettle with a nitrogen sparge and fitted with a heating mantle, reflux condenser, Dean-Stark distilling trap, thermocouple, and mechanical stirrer. This charge was gently stirred, and 438.42 g (3.0 moles) of adipic acid was added over a period of 10 minutes; during this time the temperature rose from 25° C. to 97° C.

With stirring continuing, the reaction mixture was then heated to 170° C. for 3.5 hours. At this point 101.2 mL distillate was removed. The reaction mixture was cooled to 145° C. and 465 mL warm distilled water was added to the resin kettle. The resulting prepolymer product had a total solids content of 60.3% and a reduced specific viscosity of 0.1635 dL/g, measured at 2.0 g/dL in 1.0 M $NH_4Cl$ at 25° C. This prepolymer was further diluted with distilled water to obtain a solution having a 25.0% solids content.

EXAMPLE 3

A quantity of 206.34 g (2.0 moles) DETA was placed in a 1000 mL resin kettle fitted with heating mantle, reflux condenser, Dean-Stark distilling trap, thermocouple, and mechanical stirrer. This charge was stirred, and 292.28 g (2.0 moles) of adipic acid was added over a period of 10 minutes; during this time the temperature rose from 25° C. to 90° C.

With stirring continuing, the reaction mixture was then heated to 170° C., until 58 mL distillate was collected. This point was reached one hour after the temperature reached 170° C. Heating was discontinued, and 427 mL of warm distilled water was added to the resin kettle. The resulting product had a total solids content of 51.5% and a reduced specific viscosity of 0.0941 dL/g, measured at 2.0 g/dL in 1.0 M $NH_4Cl$ at 25° C.

EXAMPLE 4

A prepolymer was prepared by the same procedure as that of Example 3. The product had a total solids content of 50.9% and a reduced specific viscosity of 0.0965 dL/g, measured at 2.0 g/dL in 1.0 M $NH_4Cl$ at 25° C.

EXAMPLE 5

Quantities of 273.90 g (2.66 moles) DETA and 42.15 g (0.69 moles) ethanolamine were placed in a 1000 mL resin kettle fitted with heating mantle, reflux condenser, Dean-Stark distilling trap, thermocouple, and mechanical stirrer. The contents of the resin kettle were subjected to gentle stirring. While the stirring continued, 438.32 g (3.0 moles) of adipic acid was added over a period of 15 minutes; during this time the temperature rose from 25° C. to 118° C.

With stirring still continuing, the reaction mixture was then heated to 170° C. for three hours. At this point 96 mL distillate was collected. The temperature was then increased to 185° C., and maintained there for one hour. An additional 11.6 mL of distillate was collected over this time.

The reaction was then cooled to 160° C., and 450 mL of warm distilled water was added to the resin kettle; the kettle contents were cooled to room temperature. The resulting product had a total solids content of 60.4% and a reduced specific viscosity of 0.0856 dL/g, measured at 2.0 g/dL in 1.0 M $NH_4Cl$ at 25° C.

EXAMPLE 6

Quantities of 232.13 g (2.25 moles) DETA and 91.62 (1.50 moles) ethanolamine were placed in a 1000 mL resin kettle fitted with heating mantle, reflux condenser, Dean-Stark distilling trap, thermocouple, and mechanical stirrer. The contents of the resin kettle were subjected to gentle stirring. While the stirring continued, 438.32 g (3.0 moles) of adipic acid was added over a period of 15 minutes; during this time the temperature rose from 25° C. to 111° C.

With stirring still continuing, the reaction mixture was then heated to 170° C. for four hours. At this point 91 mL distillate was collected. Heating was then discontinued, and 650 mL of warm distilled water was added to the resin kettle. The product was cooled to room temperature. This material had a total solids content of 49.7% and a reduced specific viscosity of 0.0685 dL/g, measured at 2.0 g/dL in 1.0 M $NH_4Cl$ at 25° C.

EXAMPLE 7

A prepolymer was prepared by the same procedure as that of Example 6. During this procedure 99 mL of distillate was collected. This product had a total solids content of 50.9% and a reduced specific viscosity of 0.0692 dL/g, measured at 2.0 g/dL in 1.0 M $NH_4Cl$ at 25° C.

Synthesis of the Resins of Example 8–11

EXAMPLE 8

To a 500 mL resin kettle fitted with a reflux condenser, thermometer, and mechanical stirrer were added 250 mL distilled water and 37.0 g of the prepolymer of Example 1 (0.173 eq. amine). This mixture was stirred until the prepolymer dissolved.

The pH of the resulting solution was 11.8. Acetic acid was added to adjust the pH to 9.0, and the solution was gently stirred. With stirring continuing, a quantity of 15.0 g (0.0635 mole) GPTMS was added dropwise to the solution over a period of 30 minutes. At this point the pH of the reaction mixture was 8.8; it was then heated to 35° C.

After 30 minutes the reaction mixture gelled. This gelled product was removed from the resin kettle, washed with acetone, and allowed to evaporate overnight. The next day the dried gel was suspended in distilled water and the pH of the suspension was adjusted to 12.1 with sodium hydroxide. After one hour the gel dissolved completely to give a clear solution. Drying this solution overnight afforded a film that was water insoluble and pliable after washing with distilled water.

EXAMPLE 9

To a 500 mL resin kettle fitted with a reflux condenser, thermometer, and mechanical stirrer were added 350 mL distilled water and 37.0 g of the prepolymer of Example 1 (0.173 eq. amine). This mixture was gently stirred until the prepolymer had dissolved.

With stirring continuing, a quantity of 6.0 g (0.04 mole) GTMAC was added to the solution. At this point the reaction was heated to 40° C. for one hour. The reaction mixture was then cooled to room temperature, and 8.0 g (0.034 mole) of GPTMS was added dropwise over a 15 minute period.

The resulting solution was heated to 35° C. for three hours, and then cooled. The resin product was precipitated by pouring the solution into a ten-fold excess by volume of acetone.

The solid product was chopped into smaller pieces and allowed to air dry. Analysis of the dried product by atomic absorption spectroscopy gave a value of 2.8 weight percent silicon. Nitrogen analysis of the product gave a value of 21.2 weight percent nitrogen. This product would not dissolve in distilled water at neutral pH, but did dissolve in water at pH 12.

Specifically, a solution was prepared by gently stirring 4.0 g of product resin with 40 mL of distilled water for two days, with the pH adjusted to 12 by addition of NaOH. When the pH was adjusted to 8.5 with acetic acid the solution turned hazy. To this solution was added 1.0 g of finely divided HVE cellulose. This mixture was gently stirred for two minutes, after which the slurry was vacuum filtered through a Buchner funnel with a #40 Whatman filter paper.

The filtered cake thusly obtained was dried in a convection oven for one hour at 85° C. to obtain a dry cake, in the form of a thick circular sheet. It was found that the dry cake did not disperse in distilled water when it was suspended in the water and swirled. By contrast, a control sheet made using only HVE cellulose dispersed instantaneously when suspended in distilled water and swirled. This result demonstrates the wet strengthening nature of the resin.

EXAMPLE 10

To a 500 mL resin kettle fitted with a reflux condenser, thermometer, and mechanical stirrer were added 250 mL distilled water and 148.0 g of the prepolymer of Example 2 (37.0 g solids, 0.173 eq. amine). The pH of the resulting solution was 9.57.

The solution was gently stirred and heated to 40° C., after which a quantity of 8.0 g (0.034 mole) GPTMS was added dropwise to the still stirring solution over a period of 30 minutes. The temperature of the stirred reaction mixture was maintained at 40° C. for three hours.

At this point the heating was discontinued and the reaction mixture was cooled to ambient temperature. The product was isolated by precipitating it into a ten-fold excess by volume of acetone.

EXAMPLE 11

To a 500 mL resin kettle fitted with a reflux condenser, thermometer, and mechanical stirrer were added 350 mL distilled water and 37.0 g of the prepolymer of Example 1 (0.173 eq amine). This mixture was gently stirred until the prepolymer dissolved; with stirring continuing, the resulting solution, with a pH of 10.1, was heated to 40° C., after which a quantity of 8.0 g (0.034 mole) GPTMS was added dropwise to the still stirring solution over a period of 30 minutes.

The temperature of the stirred reaction mixture was maintained at 40° C. for three hours. At this point the heating was discontinued and the reaction mixture was cooled to ambient temperature. The reaction mixture had a pH of 10.0 at this point. The product was isolated by precipitating it into a ten-fold excess by volume of acetone.

Synthesis of the Resins of Example 12–23

The prepolymer of Example 3 was used to prepare the resins of Examples 12 and 13, and the Example 4 prepolymer was used to prepare the resin of Example 14. The prepolymer of Example 5 was used to prepare the resins of Examples 15 and 16, and the prepolymer of Example 6 was used to prepare the resins of Examples 17 and 18. The Example 7 prepolymer was used to prepare the resins of Examples 19 to 23.

A 1000 mL 4-necked flask fitted with a reflux condenser, addition funnel, thermocouple, and mechanical stirrer was used as the reaction vessel for Examples 12–14. In Examples 15–23, a similarly equipped 500 mL flask was employed as the reaction vessel. For Examples 12–22, prepolymer, distilled water, and GPTMS silylating agent were added to the reaction vessel, this mixture was gently stirred, and the temperature of the mixture was raised to 40° C. In Example 23, after the prepolymer and distilled water were added to the reaction vessel and gentle stirring was initiated, the temperature was raised to 40° C., at which time the GPTMS was added dropwise to the stirred solution over a period of 30 minutes.

Viscosity of the reaction mixtures was monitored using Gardner-Holdt tubes while the temperature was held at 40° C. The reactions were held at this temperature until the sample viscosity reached a Gardner-Holdt value of "L" or until the viscosity did not change over a one hour period. At the appropriate end point, heating of the reaction was discontinued and distilled water was added to the vessel.

Table 1 below sets forth the amounts of prepolymer (grams/grams solids/equivalents of amine), water, and GPTMS (grams/moles) employed in preparing the silyl-linked polyamidoamines of Examples 12–23, as well as the time required to reach the end point and the amount of water added to the reaction at the end point. Table 1 also sets forth the pH, solids content (in percent by weight), and Brookfield viscosity (in centipoises) of the product, as well as the above-noted Gardner-Holdt reaction points and reduced specific viscosity of the product resin.

TABLE 1

Synthesis of Silylated Polyamidoamine Resins

| Example Number | Prepol RSV(dL/g)[1] | Prepolymer; g/g solids/eq[2] | GPTMS g/moles[3] | Water (mL) | Temp (°C.) | Time; min.[4] | Resin G-H[5] | Added Water (mL) | B.V. (cPs)[6] | Resin RSV(dL/g)[1] | pH | Solids (% by wt.) |
|---|---|---|---|---|---|---|---|---|---|---|---|---|
| 12 | 0.0941 | 186.46/96.03/0.45 | 13.30/0.0562 | 159 | 40 | 215 | C | 2008 | 6.01 | n/d | 9.55 | 4.3 |
| 13 | 0.0941 | 186.46/96.03/0.45 | 26.60/0.1125 | 159 | 40 | 35 | L | 1815 | 4.51 | n/d | 9.30 | 5.1 |
| 14 | 0.0965 | 188.66/96.03/0.45 | 19.14/0.081 | 159 | 40 | 58 | L | 1828 | 4.01 | n/d | 9.72 | 4.4 |
| 15 | 0.0856 | 90.52/54.68/0.225 | 7.98/0.0337 | 100 | 40 | 250 | F | 150 | 16.0 | 0.1400 | 9.80 | 16.0 |
| 16 | 0.0856 | 90.52/54.68/0.225 | 10.64/0.045 | 100 | 40 | 67 | L+ | 150 | 22.0 | 0.1789 | 9.78 | 16.8 |
| 17 | 0.0685 | 131.60/65.41/0.225 | 20.1/0.085 | 100 | 40 | 115 | L | 50 | 120.0 | 0.2149 | 9.28 | 26.2 |
| 18 | 0.0685 | 87.74/43.61/0.15 | 17.72/0.075 | 140 | 40 | 265 | H | 118 | 5.01 | 0.2149 | 10.06 | 7.3 |
| 19 | 0.0685 | 128.51/65.41/0.225 | 20.1/0.085 | 100 | 40 | 123 | L | 50 | 151.0 | 0.2016 | 9.83 | 26.0 |
| 20 | 0.0692 | 128.51/6541/0.225 | 20.1/0.085 | 100 | 40 | 133 | L | 83 | 44.6 | 0.1748 | 9.60 | 23.3 |
| 21 | 0.0692 | 128.51/65.41/0.225 | 20.1/0.085 | 100 | 40 | 111 | L | 83 | 70.1 | 0.1749 | 9.51 | 23.7 |
| 22 | 0.0692 | 128.51/65.41/0.225 | 20.1/0.085 | 100 | 40 | 123 | L | 83 | 55.9 | 0.1827 | 9.66 | 23.3 |
| 23[7] | 0.0692 | 128.51/65.41/0.225 | 20.1/0.085 | 100 | 40 | 104 | L | 83 | 112.0 | 0.1868 | 9.53 | 23.6 |

[1] Reduced specific viscosity (RSV) was measured at 25° C. in 1.0M $NH_4Cl$ at a concentration of 2.00 g/dL.
[2] Grams of prepolymer solution/grams of solid prepolymer/ total equivalents of reactive amine in prepolymer
[3] Grams 3-glycidoxypropyltrimethoxysilane (GPTMS)/moles GPTMS
[4] Time for reaction mixture to reach end point after temperature reaches 40° C.
[5] Gardner-Holdt viscosity of the resin at the reaction end point.
[6] Brookfield viscosity in centipoises.
[7] Reaction was heated to 40° C. before adding GPTMS. GPTMS added over 20 minutes.

Adhesion Testing

To provide a device for evaluating the adhesive properties of potential creping adhesives, a heatable cast iron block was mounted as a lower platen on the actuator of a MTS® Test Star™ materials testing instrument, made by MTS Co., Minneapolis, Minn. The testing instrument has a stationary upper platen connected to the instrument's load cell.

A paper sample was attached to the upper platen with double sided tape. The paper used in this procedure was a 40# basis weight sheet prepared from a 50/50 hardwood/ softwood bleached Kraft furnish.

The lower platen was heated to 120° C., and sprayed with an aqueous solution of the adhesive being tested. A known quantity of the adhesive solution, having a known concentration of the adhesive, was employed.

The known quantity of solution, with known concentration was provided by the use of an airbrush fitted with a volumetric spray bottle; the airbrush employed was Paasche V airbrush made by Paasche Airbrush Company, Harwood Heights, Ill. The volumetric spray bottle allowed accurate measurement of the volume of solution to be applied to the heated block. In these tests, a 1.2 mL solution having a 4.0% solids concentration was employed, with the pH of the solution being adjusted to 7.0 prior to testing. Specifically, the solution of the subsequently identified prior art creping adhesive was found to be acidic, and therefore its pH was adjusted by the addition of sodium hydroxide; the solutions of the subsequently identified resins of the invention were found to be basic, and therefore their pH's were adjusted by the addition of sulfuric acid.

After the adhesive solution was sprayed onto the heated block, the actuator was raised to contact the heated block to the paper sample with a force of 10 kg. The actuator was then lowered, and the force necessary to pull the lower platen away from the paper was determined; this force was measured as the adhesion value of the adhesive being tested.

Because the applied force was not always exactly 10 kg, the adhesion value obtained was normalized to account for slight variations in the applied force. This normalization was accomplished by multiplying the measured adhesion value by [10/(Applied force in kg)].

The results of the foregoing adhesion testing are listed in Table 2 below. This table sets forth the adhesion values of four silyl-linked resins of the present invention, in comparison with the adhesive value obtained from the creping adhesive prepared in accordance with Example 1 of U.S. Pat. No. 5,338,807.

As can be seen, the resins of the invention generally exhibit good adhesion, in comparison with the prior art adhesive. In fact, for Examples 13–16 superior results were obtained.

TABLE 2

Adhesion Testing of Creping Formulations

| Sample Type | Adhesion (kg) |
|---|---|
| U.S. Pat. No. 5,338,807; Example 1 | 12.6 |
| Example 12 | 10.6 |
| Example 13 | 14.2 |
| Example 14 | 14.4 |
| Example 15 | 12.9 |
| Example 16 | 16.0 |

Finally, although the invention has been described with reference to particular means, materials, and embodiments, it should be noted that the invention is not limited to the particulars disclosed, and extends to all equivalents within the scope of the claims.

What is claimed is:

1. A fibrous web comprising cellulosic material, glass fiber, and a silyl-linked polyamidoamine,
   wherein the silyl-linked polyamidoamine comprises the reaction product of at least one silylating agent and at least one polyamidoamine, which comprises the reaction product of reactants selected from the group consisting of:
   (a) dicarboxylic acid or dicarboxylic acid derivative selected from the group consisting of dicarboxylic acid esters and halides;
   (b) polyamine comprising at least two amidization reactive amine groups;

(c) endcapping agent selected from the group consisting of monofunctional carboxylic acids and monofunctional amines; and (d) cationizing agent selected from the group consisting of glycidyltrimethylammonium chloride (GTMAC), [2-bromoethyl]trimethylammonium bromide, [3-bromopropyl]trimethylammonium bromide, [3-bromopropyl]trimethylammonium bromide, [3-[methacryloylamino]propyl]trimethylonium chloride, [2-[methacryloyloxy]ethyl] trimethylammonium chloride, [2-[methacryloyloxy]ethyl]trimethylammonium methyl sulfate, [2-acryloyloxyethyl][4-benzoylbenzyl] dimethylammonium bromide and [2-[acryloyloxy]ethyl]trimethylammonium methyl sulfate.

2. The fibrous web of claim 1 comprising about 1–99 percent by weight of the cellulosic material, about 1–99 percent by weight of the glass fiber, and about 0.01–10 percent by weight of the silyl-linked polyamidoamine, based on the dry weight of the total materials present.

3. The fibrous web of claim 2 comprising about 10–90 percent by weight of the cellulosic material, about 2–80 percent by weight of the glass fiber, and about 0.05–5 percent by weight of the silyl-linked polyamidoamine, based on the dry weight of the total materials present.

4. The fibrous web of claim 3 comprising about 10–90 percent by weight of the cellulosic material, about 5–50 percent by weight of the glass fiber, and about 0.1–2 percent by weight of the silyl-linked polyamidoamine, based on the dry weight of the total materials present.

5. The fibrous web of claim 1 wherein the glass fiber is selected from the group consisting of chopped strand fibers and blown glass fibers.

6. A fibrous web comprising cellulosic material, silicate mineral, and a silyl-linked polyamidoamine, wherein the silyl-linked polyamidoamine comprises the reaction product of at least one silylating agent and at least one polyamidoamine, which comprises the reaction product of reactants selected from the group consisting of:

(a) dicarboxylic acid or dicarboxylic acid derivative selected from the group consisting of dicarboxylic acid esters and halides;

(b) polyamine comprising at least two amidization reactive amine groups;

(c) endcapping agent selected from the group consisting of monofunctional carboxylic acids and monofunctional amines; and (d) cationizing agent selected from the group consisting of glycidyltrimethylammonium chloride (GTMAC), [2-bromoethyl]trimethylammonium bromide, [3-bromopropyl]trimethylammonium bromide, [3-bromopropyl]trimethylammonium bromide, [3-[methacryloylamino]propyl]trimethylammonium chloride, [2-[methacryloyloxy]ethyl] trimethylammonium chloride, [2-[methacryloyloxy]ethyl]trimethylammonium methyl sulfate, [2-acryloyloxyethyl][4-benzoylbenzyl] dimethylammonium bromide and [2-[acryloyloxy]ethyl]trimethylammonium methyl sulfate.

7. The fibrous web of claim 6 comprising about 1–99 percent by weight of the cellulosic material, about 1–99 percent by weight of the silicate mineral, and about 0.1–10 percent by weight of the silyl-linked polyamidoamine, based on the dry weight of the total materials present.

8. The fibrous web of claim 7 comprising about 10–90 percent by weight of the cellulosic material, about 2–80 percent by weight of the silicate mineral, and about 0.05–5 percent by weight of the silyl-linked polyamidoamine, based on the dry weight of the total materials present.

9. The fibrous web of claim 8 comprising about 10–90 percent by weight of the cellulosic material, about 5–50 percent by weight of the silicate mineral, and about 0.1–2 percent by weight of the silyl-linked polyamidoamine, based on the dry weight of the total materials present.

10. The fibrous web of claim 6 wherein the silicate mineral is selected from the group consisting of quartz, silica, fumed silica, kaolin clay, serpentine clay, montmorillonite clay, attapulgite clay, vermiculite, glauconite, talc, mica, and diatomaceous earth.

11. A fibrous web comprising cellulosic material, glass fiber, silicate mineral and a silyl-linked polyamidoamine, wherein the silyl-linked polyamidoamine comprises the reaction product of at least one silylating agent and at least one polyamidoamine, which comprises the reaction product of reactants selected from the group consisting of:

(a) dicarboxylic acid or dicarboxylic acid derivative selected from the group consisting of dicarboxylic acid esters and halides;

(b) polyamine comprising at least two amidization reactive amine groups;

(c) endcapping agent selected from the group consisting of monofunctional carboxylic acids and monofunctional amines; and (d) cationizing agent selected from the group consisting of glycidyltrimethylammonium chloride (GTMAC), [2-bromoethyl]trimethylammonium bromide, [3-bromopropyl]trimethylammonium bromide, [3-bromopropyl]trimethylammonium bromide, [3-[methacryloylamino]propyl]trimethylammonium chloride, [2-[methacryloyloxy]ethyl] trimethylammonium chloride, [2-[methacryloyloxy]ethyl]trimethylammonium methyl sulfate, [2-acryloyloxyethyl][4-benzoylbenzyl] dimethylammonium bromide and [2-[acryloyloxy]ethyl]trimethylammonium methyl sulfate.

12. The fibrous web of claim 11 comprising about 1–99 percent by weight of the cellulosic material, about 1–99 percent by weight of the glass fiber, about 1–99 percent by weight of the silicate mineral, and about 0.01–10 percent by weight of the silyl-linked polyamidoamine, based on the dry weight of the total materials present.

13. The fibrous web of claim 12 comprising about 10–90 percent by weight of the cellulosic material, about 2–80 percent by weight of the silicate mineral, and about 0.05–5 percent by weight of the silyl-linked polyamidoamine, based on the dry weight of the total materials present.

14. The fibrous web of claim 13 comprising about 10–90 percent by weight of the cellulosic material, about 5–50 percent by weight of the glass fiber, about 5–50 percent by weight of the silicate mineral, and about 0.1–2 percent by weight of the silyl-linked polyamidoamine, based on the dry weight of the total materials present.

15. The fibrous web of claim 11 wherein the silicate mineral is selected from the group consisting of quartz, silica, fumed silica, kaolin clay, serpentine clay, montmorillonite clay, attapulgite clay, vermiculite, glauconite, talc, mica, and diatomaceous earth.

16. The fibrous web of claim 11 wherein the glass fiber is selected from the group consisting of chopped strand fibers and blown glass fibers.

* * * * *